May 20, 1930.   H. M. BLACK   1,759,820
APPARATUS FOR CLEANING GLASS POLISHING PADS
Filed May 4, 1927
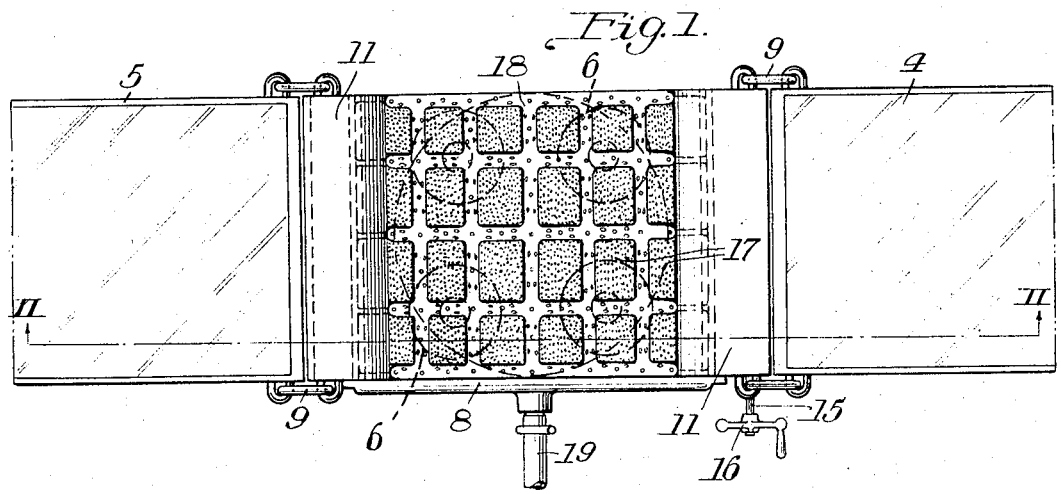
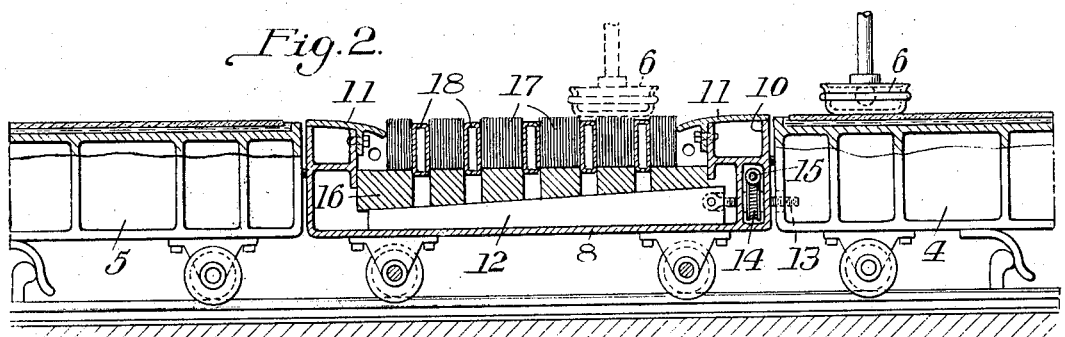
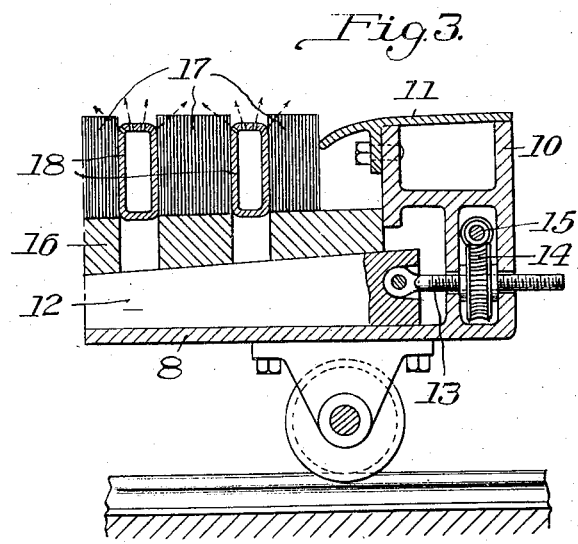
INVENTOR
Harold M. Black
By Robson D. Brown
Attorney Patented May 20, 1930

1,759,820

UNITED STATES PATENT OFFICE

HAROLD M. BLACK, OF BUTLER, PENNSYLVANIA, ASSIGNOR TO HARTFORD-EMPIRE COMPANY, OF HARTFORD, CONNECTICUT, A CORPORATION OF DELAWARE

APPARATUS FOR CLEANING GLASS-POLISHING PADS

Application filed May 4, 1927. Serial No. 188,848.

My invention relates more particularly to the cleaning of pads employed in connection with polishing of plate glass.

In what is known as the continuous system of polishing plate glass, wheeled tables carry the plates of glass beneath polishing heads that are rotated about vertical axes, the heads being covered with felts, and rouge or other polishing material is supplied to the surface of the glass, in order to facilitate the polishing action. The pads or felts become glazed and hardened through the imbedment of foreign matter therein, and the caking or drying of the rouge thereon. Particles of glass also become imbedded in the pads, and they finally become ineffective to exert a proper polishing action. In some cases, the pads are removed so that they can be replaced with other pads while being cleaned, but it is necessary to suspend polishing operations while such change is being effected.

In other cases, runners or units carrying several pads are either removed entirely for cleaning and others substituted therefor, or they are put out of action and cleaned in position by removing them from contact with the glass. In either case, the glass which has become heated by reason of the polishing action cools considerably in passing over the gap occasioned by the removal or displacement of a polisher unit. When substituted heads are brought into contact with the glass, or the heads that have been temporarily suspended for cleaning are replaced, they are of different temperature than the glass and are very apt to cause breakage.

My invention has for one of its objects the provision of a method and means whereby polishing pads may be cleaned or resurfaced without the necessity of interrupting the movement of the glass-carrying tables for an appreciable period of time.

Another object of my invention is to simplify and improve generally the methods and apparatus for cleaning and resurfacing polishing pads.

Another object of my invention is to provide a method and apparatus for cleaning pads without subjecting the glass to sudden cooling through contact with pads that have been out of operation for a considerable period of time.

One manner in which my invention may be practised is shown in the accompanying drawing, wherein Figure 1 is a plan view of apparatus which I may employ; Fig. 2 is a view taken on the line II—II of Fig. 1, and showing the manner in which my cleaning apparatus may be brought into operative relation with polishing pads, and Fig. 3 is a view of a portion of the apparatus of Fig. 2, on an enlarged scale.

In the drawing, I have shown wheeled tables or trucks 4 and 5 for carrying the plates of glass to be polished, such tables moving beneath polishing pads that are mounted in any usual manner, and rotated about vertical axes to exert a rubbing action upon the plates of glass, as the tables pass between them. One of such pads is indicated somewhat diagrammatically by the reference numeral 6. The glass sheets are commonly partially imbedded in plaster on the table tops.

When it is found necessary to clean the pads 6, a cleaning table 8 is placed in the line of cars and coupled with the other tables by a suitable connection such as hooks 9, so that all of the tables will move as a unit. The table 8 may be in the form of a hollow casting 10 that is provided with a guide plate or apron 11 at each end so that the tables may readily pass beneath the pads without catching against the edges thereof.

A wedge-like member 12 is supported upon the table and is pivotally connected to an eye bolt 13. A worm wheel 14 is journaled in the table 8 and has a threaded hub that functions as a nut to effect longitudinal movement of the eye bolt 13 when the worm wheel is rotated. Rotation of the worm wheel is effected by means of a worm shaft 15 to which a crank 16 is connected.

A block 16 is supported upon the wedge member 12 and has vertical movement upon reciprocation of the wedge.

Brushes 17 are secured to the block 16 and may be suitably composed of bristles whose lower ends are imbedded in said block. The wedge 12 provides a means of adjustment whereby the brushes 17 may be caused to project to a height where they will exercise a desired scrubbing action upon the pads.

The wedge 12 may also be withdrawn to such an extent that the brushes do not contact with the block which will then be subject merely to washing action from the water supplied through the perforations in the upper side of the casting.

A chambered casting or series of castings 18 are fixedly supported upon the table 8 through connection to the sides thereof or otherwise, and are provided with perforations in their upper sides through which water or other liquid is sprayed against the polishing pads to soften the same and facilitate cleaning thereof. Water may be supplied to the castings 8 through a flexible pipe 19, from a suitable source (not shown), the pipe being flexible so that the water can be supplied during traveling movement of the table 8.

If desired, the table casting or chamber 10 can be filled with water in order to supply the necessary moisture for softening the brushes, in which case the hose or pipe 19 can be dispensed with.

The polishing pads may operate several hours before cleaning is necessary, and it is therefore unnecessary to pass a cleaning car beneath the pads in a continuous cycle of travel. After the cleaning car has been passed through once, it may be side-tracked for a period equal to several times the length of time required to pass it along the tracks beneath the polishing heads. The glass on the cars next following the cleaning car will be rubbed by pads that have just been cleaned and therefore have not come to a proper surface to give the final finish. As this will be repeated as the car passes under each head, there will be a number of cars following this cleaning car that will not have received the proper degree of polish, owing to the fact that the pads which rub them have not yet come to the proper condition for making the finish. Therefore, some of the cars may have to be shunted from the main line of cars and passed back to go under the polishing heads a second time. This is a disadvantage, but is compensated for by the fact that there is no temperature shock to the glass at any time during the cleaning of the pads.

I claim as my invention:—

1. A cleaning device for polishing pads, comprising a table capable of traveling movement past a polishing pad in advance of a glass carrying table, a pad cleaning member on said table positioned to engage the polishing pad while traveling, and a guide plate at the rear end of said table whose forward edge extends to a plane below the plane of the succeeding glass-carrying table and whose rear edge is disposed in approximately the plane of said glass-carrying table.

2. A cleaning device for polishing pads, comprising a table capable of traveling movement past a polishing pad in association with glass-carrying tables, a pad cleaning member on said table, and a guide plate at each end of said table, the inner edges of the plates extending to a plane below the plane of the glass-carrying tables, and their outer edges being disposed in approximately the plane of said tables.

Signed at Terre Haute, Ind., this 21st day of April, 1927.

HAROLD M. BLACK.